Figure 1:
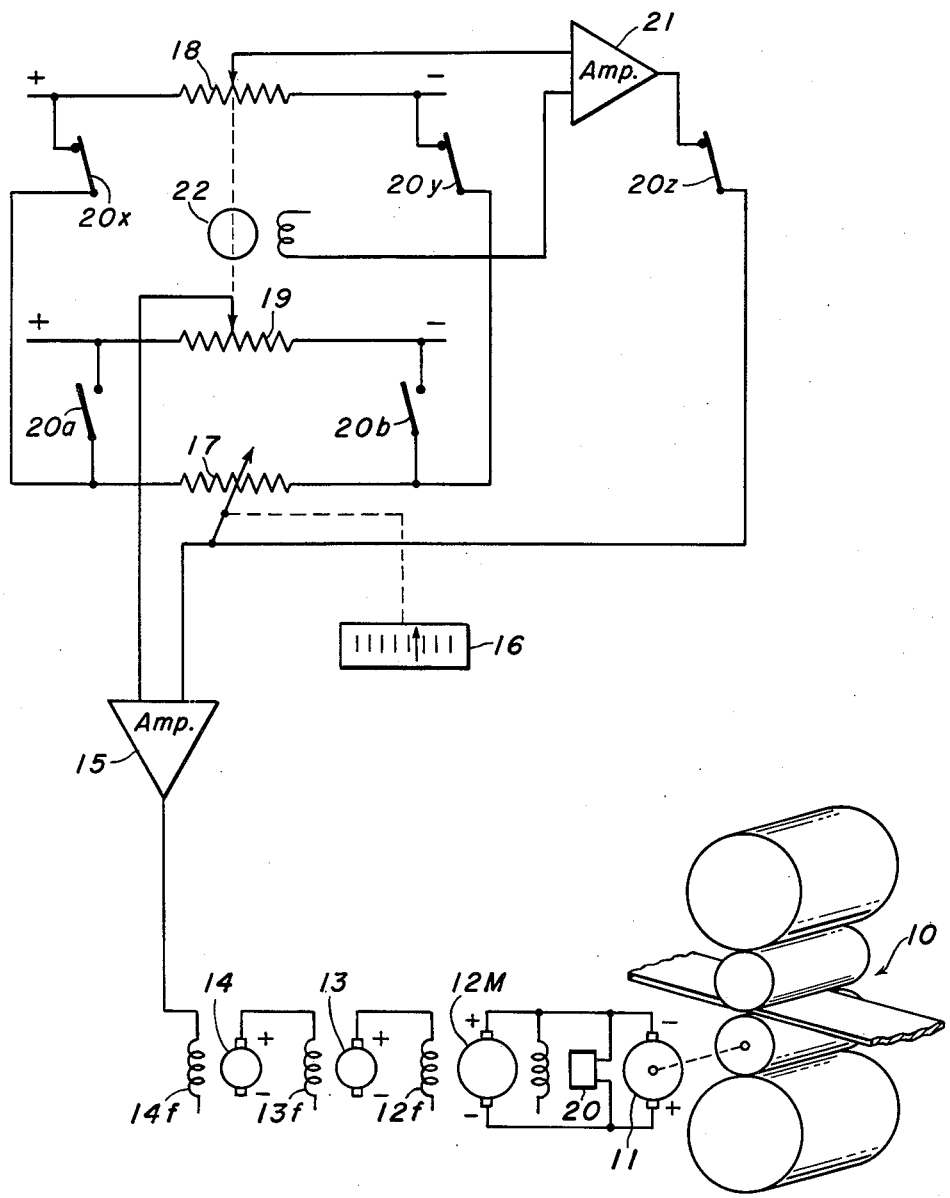

May 29, 1962

G. P. DIRTH ET AL 3,036,481

GAGE CONTROL SYSTEM FOR STRIP MILL

Filed Nov. 21, 1958

INVENTORS.
GEORGE P. DIRTH AND
IVAN FACKRELL

BY Donald G. Dalton

ATTORNEY 3,036,481
GAGE CONTROL SYSTEM FOR STRIP MILL
George P. Dirth, 867 Holly Hill Drive, Walnut Creek, Calif., and Ivan D. Fackrell, 2655 Richard Ave., Concord, Calif.
Filed Nov. 21, 1958, Ser. No. 775,422
3 Claims. (Cl. 80—35)

This invention relates to a system for controlling the speeds of rolling-mill motors to maintain uniform the gage of metal strip issuing from the mill.

Steel strip is customarily reduced to final gage from an intermediate gage to which it is hot-rolled, by cold rolling in a continuous mill. Manual control of the mill screws and the speeds of the motors driving the several stands of the mill has proved unsatisfactory to maintain the gage of the finished product within close tolerances. Automatic control systems have therefore been devised. All these systems with which we are familiar, however, are complex, expensive and difficult to maintain. It is accordingly the object of our invention to provide a simple inexpensive control system which is highly effective in operation.

We provide a control system for the motor driving the first stand which establishes a reference voltage after the strip has been initially threaded through the mill and during the early part of the short interval during which the mill accelerates to normal speed, then controls the motor speed by comparing with the reference voltage the thickness of the strip issuing from the first stand. We further provide a novel control system for the last stand or both the last and next-to-last stands, responsive to the gage of the finished strip, effective to control the speeds of the motors driving the stand. The control of motor speed thus obtained varies the tension on the strip between adjacent stands and thereby controls the degree of reduction effected by each stand.

A complete understanding of the invention may be obtained from the following detailed description and explanation which refer to the accompanying drawings illustrating the present preferred embodiment, the single FIGURE of which is a circuit showing diagrammatically the apparatus for controlling the motor driving the first stand.

Referring now in detail to the drawings the first stand of a continuous cold strip mill indicated at 10 is driven by a direct-current motor 11. Current is supplied to the motor 11 by a direct-current generator 12 driven by any convenient means (not shown). The generator has a control field winding 12f energized by an exciter 13 and a main field winding 12m. The field winding 13f of the exciter is energized by a pilot exciter 14, preferably a rotating regulator which is available from commercial suppliers. The armatures of exciters 13 and 14 are driven by a separate motor (not shown). The field winding 14f of exciter 14 is energized by a saturable-core reactor or magnetic amplifier 15 (General Electric Co. "Amplistat"). By the arrangement described, changes in the output of amplifier 15 will increase or decrease the excitation of pilot exciter 14 and similar changes considerably magnified, will be made in the armature voltages of exciter 13 and generator 12, thus eventually varying the speed of motor 11. This arrangement is conventional and is not part of our invention which concerns the means for controlling amplifier 15.

A gager 16 (Industrial Nucleonics, Inc., "Accuray") is mounted to measure the thickness of strip leaving the first stand 10. In addition to giving a visual indication, gager 16 is mechanically coupled to the moving element of a variable resistor 17. This resistor is adapted to form a Wheatstone bridge with one of two potentiometers 18 and 19, depending on the position of a relay 20 having back contacts 20x, 20y and 20z and front contacts 20a and 20b. Relay 20 is designed and connected to operate at a predetermined time after motor 11 is started, specifically after about half the period required for accelerating the motor from "threading" speed to full speed has elapsed. Before relay 20 operates, its back contacts 20x, 20y and 20z connect resistor 17 and potentiometer 18 in a Wheatstone bridge.

Assuming that the strip has been threaded through the several stands of the mill while driven at low speed and a manual controller (not shown) operated to cause the motors to accelerate to full speed, gager 16 during the first portion of the acceleration period, actuates the movable element of resistor 17 in response to variations in the gage of the strip after passing through the first stand. Such variations will usually be those resulting from non-uniformities in the gage of the hot-rolled strip entering the mill. As the moving element of resistor 17 is shifted one way or the other, the bridge it forms with potentiometer 18 is unbalanced and an amplifier 21 is affected by the degree of unbalance. Amplifier 21 is of the Bristol electronic-conversion type. Its output is applied to the control-field winding of a servo-motor 22 (Holtzer-Cabot, 2 phase) which drives the potentiometer 18 to restore the normally balanced condition of the bridge formed by resistor 17 and potentiometer 18. Potentiometer 18 is of the null-balance type and, with amplifier 21 and motor 22, constitutes the combination more fully shown in Wills Patent No. 2,423,540.

Motor 22 also drives the moving element of potentiometer 19. When relay 20 operates, potentiometer 18 is disconnected from resistor 17 at contacts 20x, 20y and 20z and potentiometer 19 is substituted by closing of contacts 20a and 20b. Thus potentiometer 19 is first set to establish a reference voltage corresponding to the thickness of the strip leaving the first stand 10 when the mill motors have been accelerated about half way to normal speed. Thereafter, any unbalance of the bridge formed by resistor 17 and potentiometer 19 is applied to amplifier 15 and serves as already explained to regulate the speed of the first stand 10. It is thus evident that, after initially establishing a setting of potentiometer 19 according to the thickness of the strip issuing from the first stand 10 during the first part of the start-up of the mill, the speed of the motor 11 is subsequently controlled to regulate tension according to this independent reference throughout the rolling of the remainder of the coil. The speed-control of motor 11, of course, is arranged to reduce the motor speed if the strip thickness is too great, thereby increasing the interstand tension. Conversely, if the strip thickness is too small, the motor speed is increased to decrease interstand tension.

The system of our invention is simple and relatively inexpensive yet highly effective in actual operation. The control system for the speed of the motor of the first stand establishes a reference voltage according to the thickness of the leading-end portion of the strip after passing through the stand and then controls the tension applied to the remainder of the strip to maintain a constant ratio between thickness and that voltage which latter is, of course, related to the tension necessary for the proper reduction of a particular thickness of strip entering the mill.

Although we have disclosed herein the preferred embodiment of our invention, we intend to cover as well any change or modification therein which may be made without departing from the spirit and scope of the invention.

We claim:
1. In a control system for a strip-rolling mill including a motor driving the mill, a generator supplying current to the motor, and means furnishing excitation to the field winding of the generator, the combination therewith of a gager measuring the thickness of strip issuing from the mill, a first means controlled by said gager establishing a reference voltage in accordance with the thickness measured thereby, a controller for said excitation means, a second means controlled by said gager effective to vary said controller on a departure in strip thickness from that corresponding to said voltage, and means controlled by acceleration of the motor from starting speed to disconnect said first gager-controlled means from the gager and connect said second gager-controlled means to said gager.

2. A control system as defined in claim 1, characterized by said first gager-controlled means being a self-balancing bridge and said second gager-controlled means being a bridge including a potentiometer driven by said self-balancing bridge.

3. In a control system for a strip-rolling mill including a motor driving the mill, a generator supplying current to the motor, and means furnishing excitation to the field winding of the generator, the combination therewith of a gager measuring the thickness of the strip issuing from the mill, a self-balancing bridge responsive to said gager, a potentiometer driven by said bridge, means controlling said excitation means, means actuated on acceleration of said motor for disconnecting said bridge from said gager and connecting said potentiometer into a second bridge affecting said excitation-control means according to differences between the thickness of the strip as measured by the gager and the setting of said potentiometer.

References Cited in the file of this patent

UNITED STATES PATENTS

| | | |
|---|---|---|
| 2,295,399 | Hanna | Sept. 8, 1942 |
| 2,626,376 | Harder et al. | Jan. 20, 1953 |
| 2,715,701 | Moore et al. | Aug. 16, 1955 |
| 2,725,509 | Wilson et al. | Nov. 29, 1955 |
| 2,851,911 | Hessenberg | Sept. 16, 1958 |
| 2,949,799 | Walker | Aug. 23, 1960 |
| 2,972,269 | Wallace et al. | Feb. 21, 1961 |